United States Patent [15] 3,677,643
Sagawa [45] July 18, 1972

[54] REFLECTIVE PLATEN

[72] Inventor: Burt K. Sagawa, Bloomington, Minn.
[73] Assignee: Minnesota Mining and Manufacturing Company, Saint Paul, Minn.
[22] Filed: April 20, 1971
[21] Appl. No.: 135,704

[52] U.S. Cl. .................................355/91, 355/73, 355/76, 355/110
[51] Int. Cl. ..........................................G03b 27/20
[58] Field of Search ..................355/73, 76, 91, 94

[56] References Cited

UNITED STATES PATENTS 3,521,538    7/1970    Escoli ................................355/91 X Primary Examiner—Samuel S. Matthews
Assistant Examiner—Richard M. Sheer
Attorney—Kinney, Alexander, Sell, Steldt & Delahunt

[57] ABSTRACT

A platen having a wall defining a reflective supporting surface upon which a first sheet of material is to be supported for exposure of graphic intelligence on the first sheet by directing light toward the platen and first sheet to afford reproduction of said graphic intelligence on a second sheet. The wall may be formed with a multiplicity of orifices communicating between the first sheet on the supporting surface and a means for reducing air pressure in the orifices to attract the first sheet to the platen. A recess in the supporting surface defined by a converging wall is formed about each orifice. The converging wall is formed to reflect incident light through the discontinuity in the supporting surface defined by the recess in generally an even intensity across the discontinuity and with generally the same intensity as light is reflected by the supporting surface thereby destroying the reflected image of the orifices and recesses at the supporting surface.

10 Claims, 4 Drawing Figures

Patented July 18, 1972

3,677,643

INVENTOR.
BURT K. SAGAWA
BY Kinney, Alexander,
Sell, Steldt & DeLaHunt
ATTORNEYS

3,677,643

REFLECTIVE PLATEN

BACKGROUND OF THE INVENTION

This invention relates to a platen formed for supporting a first sheet in a position for reflex exposure to produce an image of the first sheet on a second sheet, and in one aspect to a platen which is formed for even reflectivity at its supporting surface despite discontinuities in its supporting surface.

The use of a platen for supporting an original sheet of material for exposure by light to afford reproduction of graphic intelligence thereon is common in prior art copying devices.

One type of prior art device for copying graphic intelligence from a first or original sheet positions the original sheet between the reflective supporting surface of a platen and a translucent intermediate sheet material with the graphic intelligence to be copied disposed adjacent the intermediate sheet. Light is passed through the intermediate sheet to the original sheet. A light sensitive coating on the intermediate sheet is differentially exposed (desensitized) in a pattern corresponding to the graphic intelligence on the original sheet because of differences between the percentages of incident light reflected back through the intermediate sheet from the graphic intelligence and the percentage reflected from the background on the original sheet, the background typically being more reflective than the graphic intelligence. The intermediate sheet is subsequently processed with a copy sheet to form a copy of the graphic intelligence on the original sheet.

If the original sheet copied in such a device has a smaller surface area than the copy sheet, it is desirable that the supporting surface of the platen reflect as much light as the background of the original sheet through the intermediate sheet to produce a uniform background on the copy sheet. If under this condition the supporting surface is not as reflective as the background of the original sheet, or if all areas on the supporting surface do not reflect generally the same percentage of the exposure light, these differences in reflectivity will result in a corresponding pattern appearing on the copy sheet.

One prior art means which has been used in devices of this type for controlling the position of an original sheet with respect to the supporting surface of a platen includes controlling the air pressure between the original sheet and the supporting surface. The platen is formed with a multiplicity of orifices oriented at right angles to the supporting surface and communicating between the supporting surface and a source of pressure variable above or below atmospheric pressure to hold or release the original sheet with respect to the supporting surface. These orifices provide no reflection of light passing through them, thus contrast in reflectivity with adjacent portions of the supporting surface, and will produce a corresponding print of the orifices on portions of the intermediate not separated from the platen by an original sheet, and on a portion of a copy sheet which is larger than the original sheet. Such patterns are aesthetically undesirable to users of the copy machine.

SUMMARY OF THE INVENTION

The supporting surface of a platen made according to the present invention may be formed with discontinuities comprising orifices communicating with the supporting surface without producing a print of the discontinuities on a copy sheet which is larger than an original sheet.

On a platen made according to the present invention means interacting between the platen and an original sheet such as an orifice, or switching or signal means, may be located in a specially formed recess in the wall defining the supporting surface. The recess is defined by converging wall means which reflect incident light through the discontinuity defined by the recess in the supporting surface with generally an even intensity across the discontinuity and with generally the same intensity as light is reflected from the supporting surface. The platen may thus provide a background on an entire copy sheet which is essentially even in exposure with the background of a smaller original sheet, even though the supporting surface of the platen is discontinuous.

According to the present invention there is provided a platen having a wall defining a reflective supporting surface for supporting a first sheet of material in a predetermined relationship with a second material to afford reproduction of graphic intelligence by producing an image of the first sheet on the second sheet by reflection of light directed toward the supporting surface. The platen wall is formed with at least one recess defining a discontinuity in the supporting surface which recess is defined by reflective wall means for reflecting incident light through the recess in generally an even intensity across the discontinuity. The wall means reflect incident light through the discontinuity with generally the same intensity as light is reflected by the supporting surface, thereby destroying the reflected image of the recessed area at the supporting surface.

BRIEF DESCRIPTION OF THE DRAWINGS

The invention will further be described with reference to the accompanying drawings, wherein like numbers refer to like parts in several views and wherein.

DESCRIPTION OF THE PREFERRED EMBODIMENTS

Figure 1:
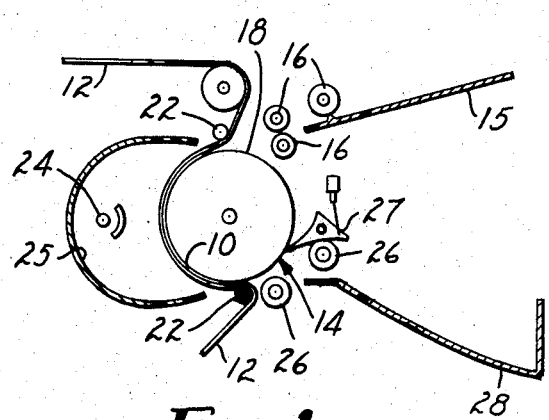
FIG. 1 is a schematic view of a portion of a copy machine incorporating a support platen made in accordance with the present invention.

FIG. 1 shows a portion of a copy machine for producing a copy of graphic intelligence on a first or original sheet 10 which machine includes a platen 14 made according to the present invention. The platen 14 provides a supporting surface 18 for supporting the original sheet 10 for exposure to afford reproduction of graphic intelligence on the original sheet 10 by producing a latent image in a second sheet or strip of translucent intermediate material 12 from light directed toward the platen 14 and original sheet 10.

The original sheet 10 is fed from a delivery chute 15 by a suitable set of feed rollers 16 to the reflective supporting surface 18 of the cylindrical platen 14 so that the graphic intelligence on the original sheet 10 is disposed opposite the supporting surface 18. The surface 18 of the platen 14 is formed with means for interacting between the platen 14 and the original sheet 10, which may comprise a multiplicity of orifices 20 (illustrated in FIGS. 2 and 3) which communicate between an original sheet 10 contacting the supporting surface 18 and a pressure below atmospheric pressure within the platen 14 produced by a pressure regulating means, thereby causing the sheet 10 to be pressed against the surface 18 so that it will be moved by rotation of the platen 14.

The strip of photo-sensitive translucent intermediate material 12 is guided by a suitably positioned set of rollers 22 around a portion of the supporting surface 18 and may be moved in synchronism with the original sheet 10 by drive means (not shown) past a light source 24 within a reflector 25 which provides light directed toward the supporting surface 18 and original sheet 10 for reflex exposure of the intermediate 12 from graphic intelligence on the original sheet 10. The intermediate 12 is then led to a processing station on the machine (not shown) at which the intermediate is placed against the copy sheet and the composite is heated; the residual light-sensitive reactant remaining at the imaged areas of the intermediate being transferred to and reactive with a coreactant in the copy sheet to produce a visible reproduction of the original image on the copy sheet.

Through a suitable control system, the original sheet 10 may be retained on the supporting surface 18 and may be moved by continued rotation of the platen 14 with the successive lengths of the intermediate material 12 past the light source 24 for a predetermined number of times to produce a desired number of copies, after which the pressure regulating means provides a higher than atmospheric pressure within the platen 14 and orifices 20 and in conjunction with a rotatable bar 27 (illustrated in a position for removing a sheet from the supporting surface 18) directs the original sheet 10 past a suitable set of guide rollers 26 to a recovery chute 28 on the machine.

Figure 2:
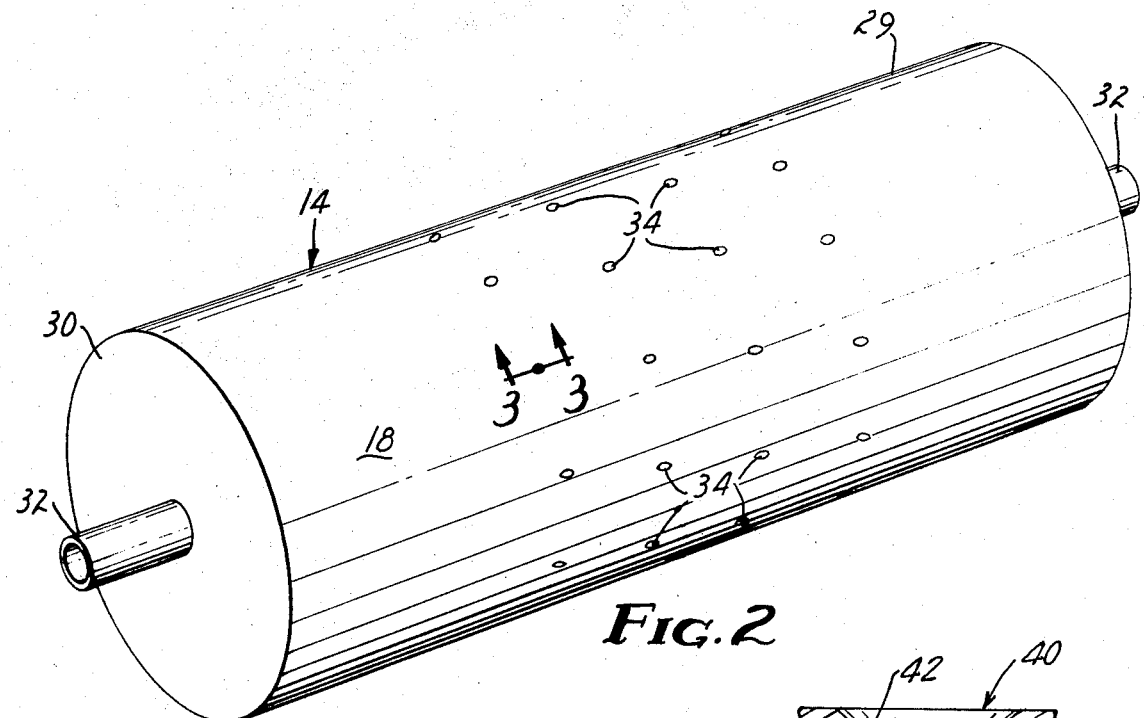
FIG. 2 is a perspective view of the platen according to the present invention that is incorporated in the machine of FIG. 1.

FIG. 2 shows in greater detail the platen 14 which provides the reflective supporting surface 18 for supporting the original sheet 10 between the surface 18 and the translucent intermediate 12. The cylindrical platen 14 is comprised of a hollow cylindrical wall member 29, circular end plates 30 and a hollow axle 32. The hollow axle 32 is connected to the pressure regulating means which comprises a pump and valve means, not shown, for establishing positive or negative air pressure within the platen 14, and in the orifices 20.

The supporting surface 18 of the cylindrical platen 14 includes means to provide an essentially even reflection of light to all portions of the intermediate material 12 adjacent the supporting surface 18 despite the presence of the orifices 20 thereon. This even reflectivity is important to impart an even degree of reflex exposure to areas of the intermediate 12 which are not separated from the supporting surface 18 by the original sheet 10, so that if a copy sheet is larger than the original sheet being copied, the image of the orifice 20 on the supporting surface 18 will not be printed on portions of the copy sheet.

Figure 3:
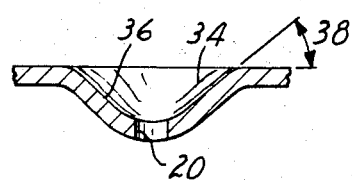
FIG. 3 is an enlarged fragmentary sectional view taken approximately along the lines 3—3 of FIG. 2.

As illustrated in FIG. 3, a specially shaped recess 34 is formed in the wall member 29 about each orifice 20. Each recess 34 is formed by deforming the wall member 29 to form a reflective converging wall means or wall 36 which defines the recess 34 about each orifice 20 with a major portion of the wall 36 disposed at a predetermined angle 38 (typically about 40°) with a tangent at the supporting surface 18. The wall 36 reflects incident light through the discontinuity in the supporting surface 18 defined by the recess 34 essentially in even distribution or even intensity across the discontinuity. Thus, while some light directed toward the supporting surface 18 will pass through each orifice 20, the light incident upon the wall 36 is reflected in a pattern which will evenly expose the section of intermediate material 12 positioned on the supporting surface 18 adjacent the recess 34. The intensity of incident light reflected to the intermediate 12 adjacent the recess 34 is generally the same as the intensity of light reflected from the balance of the supporting surface 18, and is sufficiently close that a pattern will not be produced on the copy sheet corresponding to the recessed areas 34 or the orifices 20.

Additionally, the wall means or wall 36 can be made more reflective than the supporting surface 18 so that it will reflect light to the intermediate 12 positioned above the recessed area 34 of essentially the same intensity as the light reflected from the supporting surface 18.

A reflectivity for the supporting surface above 68 percent is generally commercially acceptable for producing an even background on many presently available copy papers.

The preferred reflectivity of the supporting surface is about 85 percent which corresponds to the reflectivity of the white bond paper typically used for an original sheet 10. This reflectivity may be produced by coating the supporting surface 18 and wall 36 with a white material such as a suitable white paint.

If an electrically conductive supporting surface 18 is desired, the surface of the platen may be formed of a properly reflective metal. As an example, cadmium plated on the supporting surface 18 and walls 36 can produce a reflectivity of about 68 percent.

Figure 4:
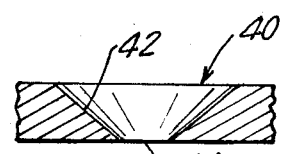
FIG. 4 is an enlarged fragmentary sectional view of an alternate method of forming the area shown in FIG. 3.

FIG. 4 illustrates an alternate method for forming a recessed area 40 having a reflective wall 42 around an orifice 44 extending through a platen wall. The wall 42 is formed as by countersinking to provide a converging wall means or wall 42 disposed entirely at a predetermined angle (typically 40°) to a supporting surface. This method may be preferable where the platen wall is too thick to be deformed.

The following is an example of physical parameters which have proved quite satisfactory in practicing the present invention: For an orifice 20 to 44 which is 0.04 inches in diameter, a generally connical recess approximately 0.06 inches deep and forming a circular discontinuity 0.20 inches in diameter in the supporting surface is concentrically formed about the orifice 20 or 44. The major portion of the reflective wall 36 or 42 is disposed at an angle of 40° with the tangent to the supporting surface. A recess 34 or 40 of these dimensions has been found to effectively destroy the reflective image of the orifice 20 or 44 at the supporting surface without causing a dimple in the original sheet and/or intermediate sheet positioned on the supporting surface due to a pressure reduction of 12 inches of water below atmospheric pressure within the recess 34 or 40. The recess may be formed by countersinking (recess 40) or by deforming the platen wall (recess 34) by the use of a punch having a spherical tip with a radius of 0.06 inches which tip forms a corresponding radius at the base of the recess 34 and a slight radius at the juncture between the supporting surface and the major portion of the reflective wall 36.

While the present invention is illustrated with respect to orifices formed in the surface of a platen, the invention may also be practiced to prevent prints on a copy sheet from recesses on a supporting surface 18 required for the incorporation of other means interacting between the original sheet 10 and the platen 14 such as switching or sensing devices. Such devices may or may not contact the surface of the intermediate 12. If a portion of the device contacts the intermediate 12, the contacting surface should have the same reflectivity as the supporting surface 18. Also, the device must be shaped so as not to block incident light being reflected by the reflective wall means through areas of the discontinuity to an intermediate 12 positioned adjacent the recess and not contacted by the device. The angle of the wall and depth of the recessed area may require some adjustment for each such application. Additionally, the recess may be in the form of a groove in the supporting surface rather than being generally conical as illustrated.

Having thus described the present invention, what is claimed is:

What I claim is:

1. In a copy machine including a platen having a wall defining a reflective supporting surface upon which a first sheet of material is to be supported for exposure to afford the reproduction of graphic intelligence on said first sheet by producing a latent image on a second sheet material from light directed toward the platen and first sheet, said wall being formed with a multiplicity of orifices in said supporting surface and communicating with means for regulating the pressure in said orifices, the improvement comprising:

said wall being formed with a plurality of recesses disposed about said orifices, each said recess being defined by converging wall means defining a discontinuity in said supporting surface, said converging wall means being reflective and being disposed for reflecting incident light through said discontinuity in even intensity across said discontinuity, thereby destroying the reflected image of said orifice at said supporting surface.

2. The machine of claim 1 wherein each said converging wall means comprises a converging wall having a reflective surface surrounding said orifice and disposed with respect to a tangent to said supporting surface at generally a 40° angle.

3. The machine of claim 1 wherein said supporting surface and wall means have a reflectivity above 68 percent.

4. The machine of claim 2 wherein said supporting surface and said reflective wall surface have a reflectivity essentially equivalent to that of white bond paper.

5. The machine of claim 2 wherein said supporting surface and the surface of said reflective wall comprise cadmium.

6. A platen having a wall defining a reflective supporting surface for supporting a first sheet of material in a predetermined relationship with a second sheet material to afford reproduction of graphic intelligence by producing an image of said first sheet on said second sheet material by reflection of light directed toward said supporting surface, said platen being formed with at least one recess in said wall, said recess defining a discontinuity in said supporting surface and being defined by reflective wall means for reflecting incident light through said discontinuity in generally an even intensity across said discontinuity and with an intensity generally equal to light reflected by said supporting surface, thereby destroying the reflected image of said recess at said supporting surface.

7. A platen as described in claim 6 further comprising means located in said recess for interacting between a said sheet on said supporting surface and said platen.

8. A platen according to claim 7 wherein said means interacting between a said sheet and said platen comprises an orifice formed in said platen wall and communicating between a said sheet on said supporting surface and a source of adjustable pressure.

9. The machine of claim 6 wherein each said converging wall means comprises a converging wall having a reflective surface surrounding said orifice and disposed with respect to a tangent to said supporting surface at generally a 40° angle.

10. The machine of claim 6 wherein said supporting surface and wall means have a reflectivity about 68 percent.

* * * * *

UNITED STATES PATENT OFFICE
CERTIFICATE OF CORRECTION

Patent No. 3,677,643                              Dated July 18, 1972

Inventor(s)      Burt K. Sagawa

It is certified that error appears in the above-identified patent and that said Letters Patent are hereby corrected as shown below:

Column 6, line 13, change "about" to -- above --.

Signed and sealed this 2nd day of January 1973.

(SEAL)
Attest:

EDWARD M. FLETCHER, JR.                ROBERT GOTTSCHALK
Attesting Officer                      Commissioner of Patents